United States Patent
Parker (10) Patent No.: US 10,762,226 B2
(45) Date of Patent: Sep. 1, 2020

(54) REGISTER ACCESS CONTROL

(71) Applicant: ARM Limited, Cambridge (GB)

(72) Inventor: Jason Parker, Sheffield (GB)

(73) Assignee: ARM Limited, Cambridge, GA (US)

( * ) Notice: Subject to any disclaimer, the term of this patent is extended or adjusted under 35 U.S.C. 154(b) by 225 days.

(21) Appl. No.: 16/071,915

(22) PCT Filed: Feb. 10, 2017

(86) PCT No.: PCT/GB2017/050344
§ 371 (c)(1),
(2) Date: Jul. 23, 2018

(87) PCT Pub. No.: WO2017/149269
PCT Pub. Date: Sep. 8, 2017

(65) Prior Publication Data
US 2019/0034654 A1    Jan. 31, 2019

(30) Foreign Application Priority Data
Mar. 2, 2016 (GB) .................................... 1603622

(51) Int. Cl.
G06F 21/62 (2013.01)
G06F 9/38 (2018.01)
G06F 9/30 (2018.01)

(52) U.S. Cl.
CPC ........ G06F 21/6218 (2013.01); G06F 9/3013 (2013.01); G06F 9/3861 (2013.01)

(58) Field of Classification Search
CPC ... G06F 21/6218; G06F 9/3013; G06F 9/3861
See application file for complete search history.

(56) References Cited

U.S. PATENT DOCUMENTS 6,516,395 B1   2/2003  Christie
2010/0161948 A1*  6/2010  Abdallah ............. G06F 9/3857
                                              712/228

(Continued)

FOREIGN PATENT DOCUMENTS

EP   2 669 807    12/2013
GB   2 440 968    2/2008
WO   2014/159123  10/2014

OTHER PUBLICATIONS

International Search Report and Written Opinion of the ISA for PCT/GB2017/050344 dated Apr. 28, 2017, 9 pages.

(Continued)

Primary Examiner — Joseph P Hirl
Assistant Examiner — Stephen T Gundry
(74) Attorney, Agent, or Firm — Nixon & Vanderhye P.C.

(57) ABSTRACT

A data processing system 2 operates at a plurality of exception levels ELx and supports the use of protected execution environments. A register bank 16 contains registers having associated ownership variables indicating an owning exception level. Register access control circuitry 30 is responsive to the ownership values for respective registers to control access to those registers by processing circuitry 14 in dependence upon the ownership values. Target-constrained data transfer operations and associated program instructions may be provided which are able to access data values in registers not owned by the exception level associated with the execution of those program instructions, but are limited to perform data transfers to or from memory locations within a memory 6 indicated by an architected storage pointer for the owning exception level. Target-unconstrained transfer instructions at a given exception level are not able to access register data value marked as owned by a different exception level.

23 Claims, 7 Drawing Sheets

(56) References Cited

U.S. PATENT DOCUMENTS

| | | |
|---|---|---|
| 2010/0299751 A1 | 11/2010 | Otani et al. |
| 2011/0225402 A1 | 9/2011 | Grisenthwaite |
| 2012/0137075 A1* | 5/2012 | Vorbach .............. G06F 12/084 |
| | | 711/122 |
| 2012/0198164 A1* | 8/2012 | Damodaran ........ G06F 11/1064 |
| | | 711/122 |
| 2014/0283040 A1* | 9/2014 | Wilkerson ............. G06F 21/52 |
| | | 726/22 |
| 2016/0055083 A1* | 2/2016 | Rozario .............. G06F 12/084 |
| | | 711/125 |
| 2016/0098279 A1* | 4/2016 | Glew ................... G06F 9/3828 |
| | | 712/239 |
| 2016/0274810 A1* | 9/2016 | Godard ................ G06F 9/3851 |
| 2018/0150413 A1* | 5/2018 | Parker .................... G06F 9/461 |
| 2019/0102300 A1* | 4/2019 | Blankenship ....... G06F 12/0815 |
| 2019/0146710 A1* | 5/2019 | Gschwind ............ G06F 3/0673 |
| | | 711/154 |
| 2019/0377580 A1* | 12/2019 | Vorbach ............... G06F 9/3824 |
| 2019/0384604 A1* | 12/2019 | Dehon ................ G06F 9/30072 |

OTHER PUBLICATIONS

Combined Search and Examination Report for GB1603622.0 dated Jul. 29, 2016, 7 pages.

* cited by examiner

Target - Unconstrained Load/Store Instructions

STR (freely defined address)

LDR (freely defined address)

FIG. 5

Target - Constrained Load/Store Instructions

STR Blind [BRI]
    //all parameters implicit due to BRI
    data = GPR [BRI].Data
    bi = GPR [BRI].Owner        // Which BDEC
    bp = BDEC [bi]              // BDEC pointer
    brp = bp [BRI]              // BDEC register entry point
    STORE. bi data, brp       // store to protected region
    (BRI++)                  // optional index increment
                                      and flag set LDR Blind [BRI, BTEL]
    // BTEL is set to a lower exception level
    bp = BDEC [BTEL]
    brp = bp [BRI]
    LOAD, BTEL data, brp      // load from protected region
    GPR [BRI].Data = data
    GPR [BRI].Owner = BTEL
    (BRI--)                   // optional index decrement
                                      and flag set

FIG. 6

Index Reset Program Instruction

Reset BRI
    BRI=0

Index Changing Program Instruction

Increment BRI.S    //flag setting
    BRI++
    if BRI>MaxReg, set overflow flag Target Owner Setting Program Instruction Set BTEL $R_n$
    If $R_n$.Owner < current $EL_X$, BTEL=$R_n$.Owner

FIG. 7A

Exception Handling - Blind Register Saving

Reset BRI
loop:
    STRBlind [BRI]
    B.VS  loop    //not overflowed, loop to next register Exception Return - Blind Register Restore     Set BTEL $R_n$
    Reset BRI
loop:
    LDR Blind[BRI.BTEL]
    B.LZ     //not less than zero, loop to next register

REGISTER ACCESS CONTROL

This application is the U.S. national phase of International Application No. PCT/GB2017/050344 filed Feb. 10, 2017 which designated the U.S. and claims priority to GB Patent Application No. 1603622.0 filed Mar. 2, 2016, the entire contents of each of which are hereby incorporated by reference.

This disclosure relates to the field of data processing systems. More particularly, this disclosure relates to the control of access to registers storing data values within a data processing system.

It is known to provide data processing systems with registers to stored respective data values for use in data processing operations specified by program instructions. When responding to an exception, some known systems rely upon the exception handling code to save the current content of the registers as part of the responsibilities of the exception handling program code and to restore this content to the registers at the end of execution of the exception handling program code.

At least some embodiments of the disclosure provide apparatus for processing data comprising:

a plurality of registers to hold respective data values, each of said plurality of registers having an associated ownership variable;

processing circuitry to perform data processing operations specified by program instructions upon data values held within said plurality of registers;

register access control circuitry responsive to an ownership value specified by said associated ownership variable for a register of said plurality of registers to control access to said register by said processing circuitry in dependence upon said ownership value; and exception level control circuitry to control said processing circuitry to operate in a current exception level among a plurality of exception levels, wherein said ownership value specifies one of said plurality of exception level states, and said register access control circuitry restricts access to said register by said processing circuitry to perform data processing operations specified by at least some program instructions when said current exception level is different in a predetermined manner from that specified by said ownership value, and said plurality of exception levels correspond to a hierarchy of privilege levels extending from a lowest privilege level to a highest privilege level, an exception condition arising in operation of said processing circuitry, when operating at an exception level corresponding to a privilege level lower than said highest privilege level, triggering a switch to an exception level with a higher level of privilege, and said predetermined manner is that said current exception level is higher in said hierarchy than an exception level specified by said ownership value, wherein the lowest privilege level is less privileged than the highest privilege level.

At least some embodiments of the disclosure provide a method of processing data comprising:

holding respective data values within a plurality of registers, each of said plurality of registers having an associated ownership variable;

performing data processing operations specified by program instructions upon data values held within said plurality of registers;

in response to an ownership value specified by said associated ownership variable for a register of said plurality of registers, controlling access to said register by said processing circuitry in dependence upon said ownership value, controlling said processing circuitry to operate in a current exception level among a plurality of exception levels, wherein said ownership value specifies one of said plurality of exception level states, and said method further comprises restricting access to said register by said processing circuitry to perform data processing operations specified by at least some program instructions when said current exception level is different in a predetermined manner from that specified by said ownership value, and wherein said plurality of exception levels correspond to a hierarchy of privilege levels extending from a lowest privilege level to a highest privilege level, an exception condition arising in operation of said processing circuitry, when operating at an exception level corresponding to a privilege level lower than said highest privilege level, triggering a switch to an exception level with a higher level of privilege, and said predetermined manner is that said current exception level is higher in said hierarchy than an exception level specified by said ownership value, wherein the lowest privilege level is less privileged than the highest privilege level.

Example embodiments will now be described, by way of example only, with reference to the accompanying drawings in which.

Figure 1:
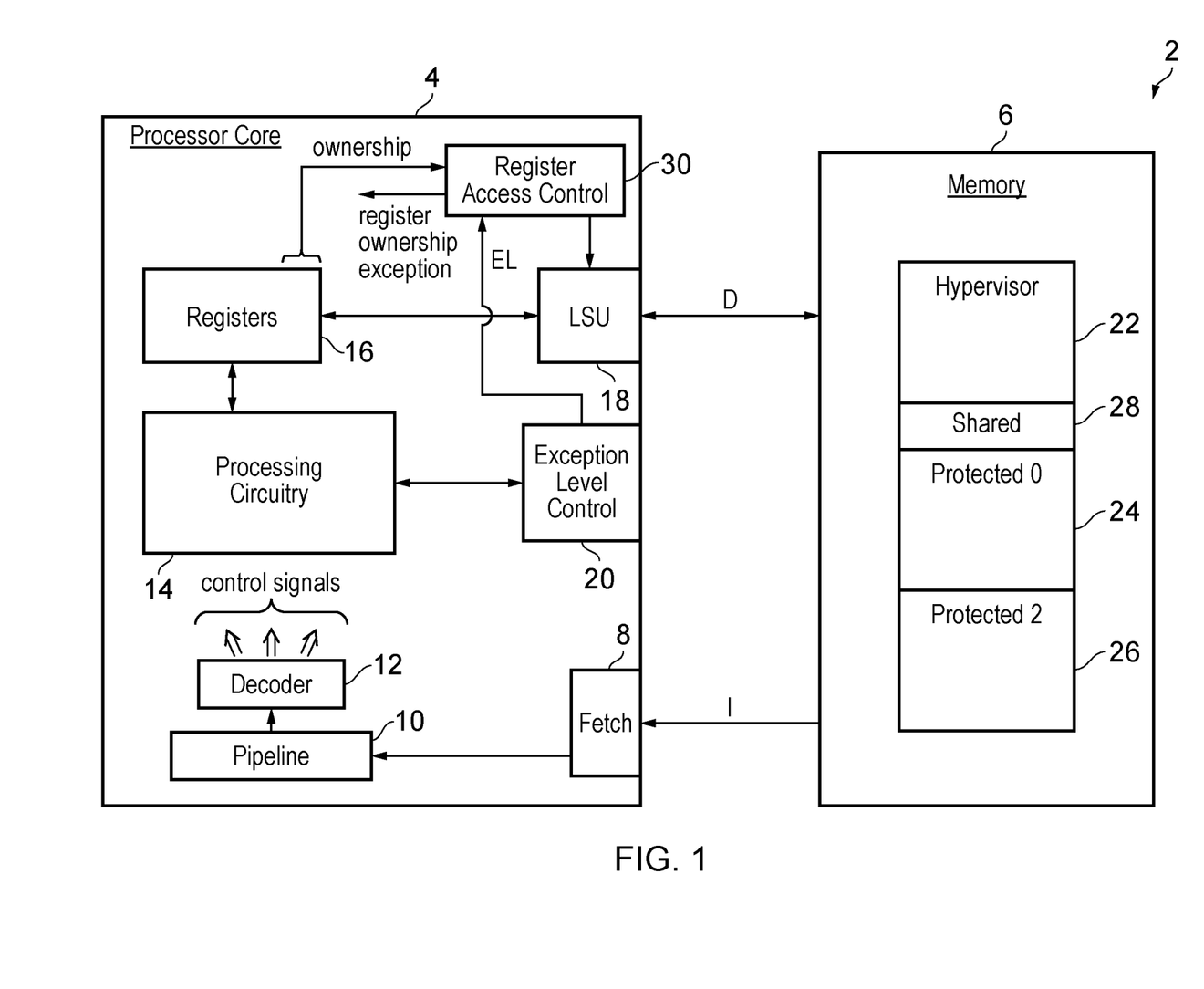
FIG. 1 schematically illustrates a data processing system including a plurality of registers and register access control circuitry.

FIG. 1 schematically illustrates a data processing system 2 including a processor core 4 coupled to a memory 6. The processor core 4 includes an instruction fetch unit 8 for fetching program instructions from the memory 6 and supplying these to an instruction pipeline 10. Decoder circuitry 12 coupled to the instruction pipeline 10 decodes these program instructions to generate control signals which control processing circuitry 14 to perform data processing operations as specified by the decoded program instructions. The data processing operations include the manipulations of data values stored within a register bank 16 of registers. These registers within the register bank 16 include scalar general purpose registers, floating point registers and configuration registers. Further types of registers maybe be provided in other embodiments, and not all embodiments need have all of these types of registers present.

A load store unit 18 performs data transfer operations of data values between registers within the register bank 16 and storage locations within the memory 6. These transfer operations may result from constrained store instructions, constrained load instructions, unconstrained store instructions, or unconstrained load instructions as will be described further below.

The data processing system 2 operates at a given time in one of the plurality of possible exception levels (privilege levels). The control of which is the current exception level and the switching between exception levels is handled by exception level control circuitry 20. Generally speaking, when operating at higher exception levels there is greater access provided to data values stored within the memory 6. However, the present disclosure provides for a protected execution context(s) in which at least some of the data associated with such a protected execution context is inaccessible when operating outside of that protected execution context, even when operating at a higher exception level (higher level of privilege).

The memory 6 illustrated in FIG. 1 shows a plurality of memory regions which have different access constrains associated therewith. A hypervisor memory region 22 is accessible to a hypervisor program, but is inaccessible to programs at a lower exception level (a lower level of privilege). A first protected region 24 and a second protected region 26 are respectively accessible when the system is operated in a first protected execution context or a second protected execution context, but are in accessible outside of those respective contexts. For example, the first protected region 24 is accessible when the data processing system 2 operating in the first protected execution context, but is inaccessible when the data processing system is executing the hypervisor program (even though this may have a higher exception level) and when executing in the second protected execution context. A shared region 28 is accessible both to the hypervisor program and when executing in the first execution context and the second execution context so as to facilitate the sharing of data values between different programs. Each of the protected execution contexts may correspond to provision of a respective protected virtual machine execution environment. The protected virtual machine execution environment may be facilitated in ensuring its data is private by allocating it a respective protective region 24, 26 in which it can store its private data such that this private data is inaccessible to other private virtual machines, or even the hypervisor program.

The processor core 4 includes register access control circuitry 30 coupled to the register bank 16. Each of the registers within the register bank 16 has an associated ownership value. Multiple registers may share an ownership value, or in other embodiments each register may have an individually settable ownership value. It is also possible that in some embodiments not all of the registers within the register bank 16 will have an ownership value, or will take part in mechanisms to protect their content upon exception handling operations as will be described further below.

The register access control circuitry serves to control access to the registers within the register bank 16 in dependence upon the ownership value specified in respect of a register to be accessed either by the processing circuitry 14 or by the load store unit 18. If the processor core 4 attempts to perform a data processing operation which violates ownership constraints specified by the ownership values, then the register access control circuitry 30 generates a register ownership exception, which may trigger actions such as closing down a protected execution environment as a safeguard against further attempts to violate its security.

In the context of the present example embodiment, the ownership values specified for registers within the register bank associate an exception level from among the plurality of possible exception levels as an exception level which "owns" the register concerned. An exception level signal EL is supplied from the exception level control circuitry 20 to the register access control circuitry 30 to indicate a current exception level in which the data processing system 2 is operating. If the register access control circuitry 30 detects that the current exception level differs from the exception level recorded as the current owner of the register to be accessed, then the register ownership exception previously mentioned is triggered and the attempted access is not permitted. Whilst in the current example embodiment the ownership values correspond to owning exception levels, it is possible that other embodiments may use different forms of ownership attribution, such as thread-based ownership, or the like.

In some embodiments, the register access control circuitry 30 may serve to constrain access to a given register so as to only permit access when the processing system 2 is currently in the same exception level as the exception level indicated as owning the register concerned. In other embodiments, the register access control circuitry may serve to provide access to a given register when the processing system 2 is at an exception level the same as that indicated as the current owner, or at a lower (less privileged) exception level, whilst not permitting access if the data processing system 2 is at a higher exception level (higher level of privilege). This is counter to the normal model whereby higher levels of privilege provide greater access, but serves the purpose of protecting the content of registers from a hypervisor program when it is desired not to permit the hypervisor program to have such access. Such a hypervisor program may be termed a 'blind' hypervisor program as while it is permitted to schedule operation of processing in protected execution environments at a lower exception level, it is not able to access private data associated with those protected execution environment as such data is stored within a protected region 24, 26 set up by, and 'owned' by, the respective protected execution environment.

Figure 2:
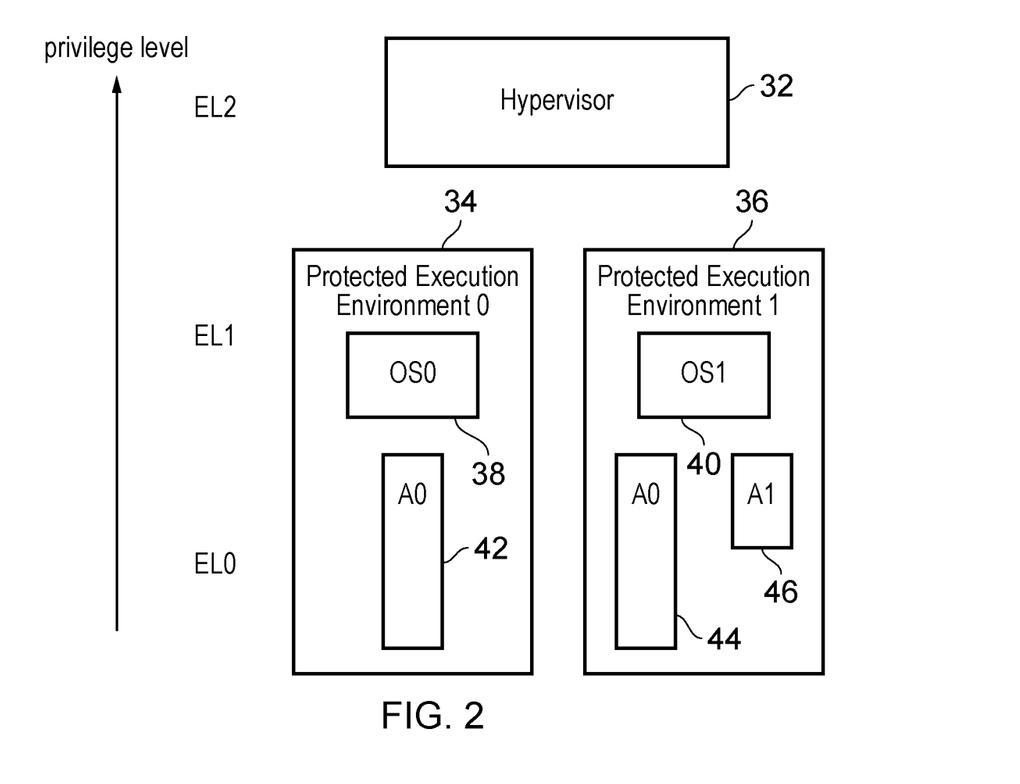
FIG. 2 schematically illustrates a hierarchy of exception (privilege) levels and associated programs running at those different exception levels.

FIG. 2 schematically illustrates a plurality of programs executing at respective exception levels. In the example of FIG. 2, a hypervisor program 32 executes at exception level EL2. This exception level has a higher level of privilege than exception levels EL1 EL0 as also illustrated in FIG. 2. The hypervisor program 32 manages scheduling of execution in two protected execution environments 34, 36. Each of these protected execution environments 34, 36 includes a respective operating system 38, 40 executing at exception level EL1 and one or more application programs 42, 44, 46 executing at exception level EL0. Each of the protected execution environments 34, 36 provides a virtual machine execution environment which is able to set up its own protected region 24, 26 in the memory 6 in which it can store private data which is protected from access by the hypervisor program 32. The programs executing within the protected execution environments 32, 36 can also store data within the shared region 28 if they wish to share that data with the hypervisor program 22 or with other programs, such as the programs executing in the other protected execution environment 34, 36.

Figure 3:
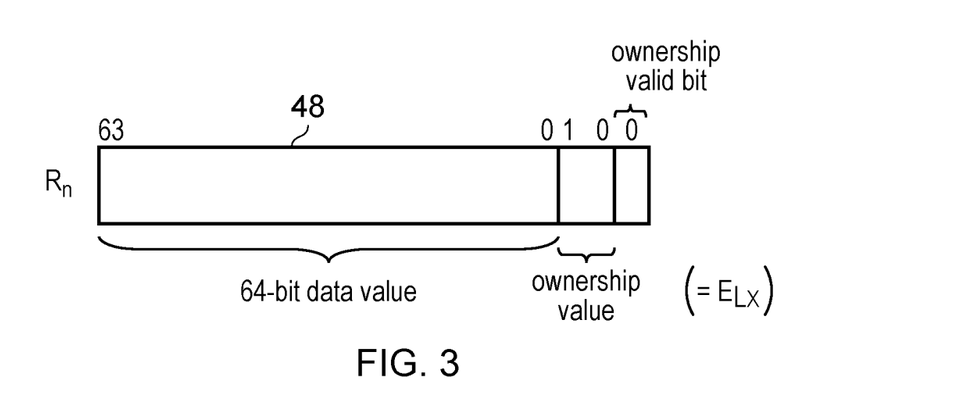
FIG. 3 schematically illustrates a register and its associated ownership value.

FIG. 3 schematically illustrates a 64-bit general purpose register 48 storing a 64-bit data value as may be found, for example, within the register bank 16. Associated with this register 48 is a two-bit ownership value which indicates the exception level ELx that owns the data value within the register 48. An ownership valid bit indicates whether the ownership value ELx is valid at a given time. When an access to the data value within the register 48 is to be made, then the register access control circuitry 30 reads the current ownership value ELx and compares it with the current exception level of the data processing system 2 as supplied by the exception level control circuitry 20 to determine whether or not the access concerned should be permitted (e.g. the current exception level of the data processing system is the same as, or lower than, the exception level indicated by the ownership value ELx).

Figure 4:
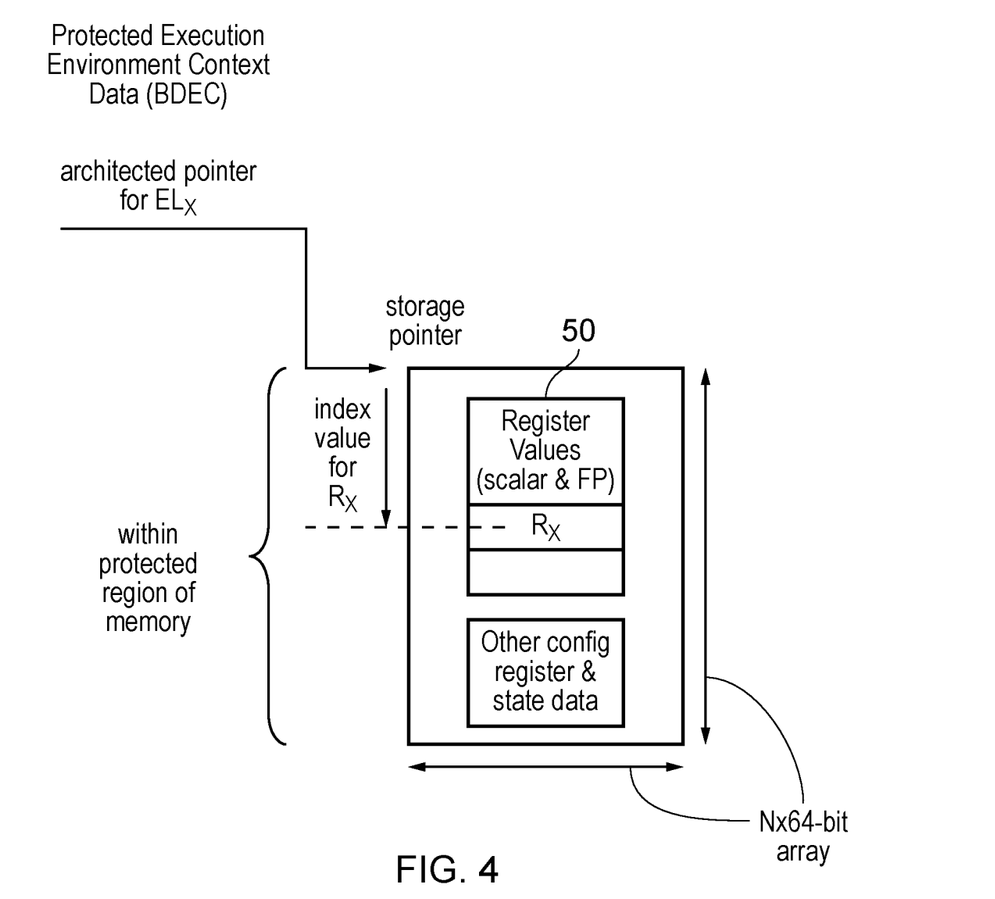
FIG. 4 schematically illustrates protected execution environment context data.

FIG. 4 schematically illustrates protected execution environment context data stored within a protected execution environments own protected region 24, 26 at least when that protected execution environment is not currently executing, e.g. when an exception has arisen and is being handled by an exception handling program executing outside of the protected execution environment, e.g. an exception handling program is being executed at a higher exception level. As previously mentioned, in this example embodiment, ownership of registers values is handled on a per-exception-level basis and accordingly there is a storage pointer (used for both loads and stores) provided as an architected state register associated with each exception level. The storage pointers are additional registers that are normally only accessed by the target constrained instructions described below and are not part of the general purpose register set. This storage pointer indicates a start address within a protected region 24, 26 of a protected execution environment where its array of 64-bit context data is stored. This context data includes a block of stored data values 50 read from the register bank 16 owned by the context concerned when that context ceased executing, such as upon occurrence of an exception. An index value is associated with the storage pointer for each exception level and indicates a particular location within the 64-bit array storing a corresponding data value for a given register Rx. Also stored within the 64-bit array may be other configuration register state data.

Upon occurrence of an exception causing a protected execution environment to be left, it is the responsibility of the exception handling code which is invoked to store the current contents of the register bank 16 so that these can be restored by the exception handling program at the end of its processing before control is returned to the original protected execution environment. The 64-bit array indicated by the storage pointer associated with the exception level which owns a particular register data value within the register bank 16 is used to direct the saving of that data value into the appropriate 64-bit array stored within a respective protected region 24, 26 of the memory 6.

Figure 5:
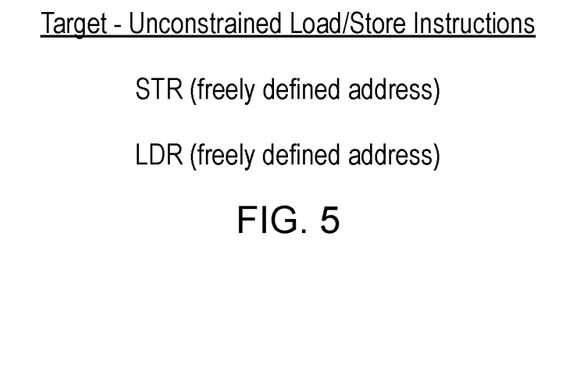
FIG. 5 schematically illustrates target-unconstrained load/store instructions.

FIG. 5 schematically illustrates target unconstrained load and store instructions. Such instructions are able to freely define the address within the memory 6 with which a transfer is to be made in a conventional manner. If such target-unconstrained load and store instructions were used for storing and restoring data values from registers associated with protected execution environments, then they might permit such data values to be stored outside of the appropriate protected region 24, 26 and accordingly become inappropriately available outside of the associated protected execution environment.

Figure 6:
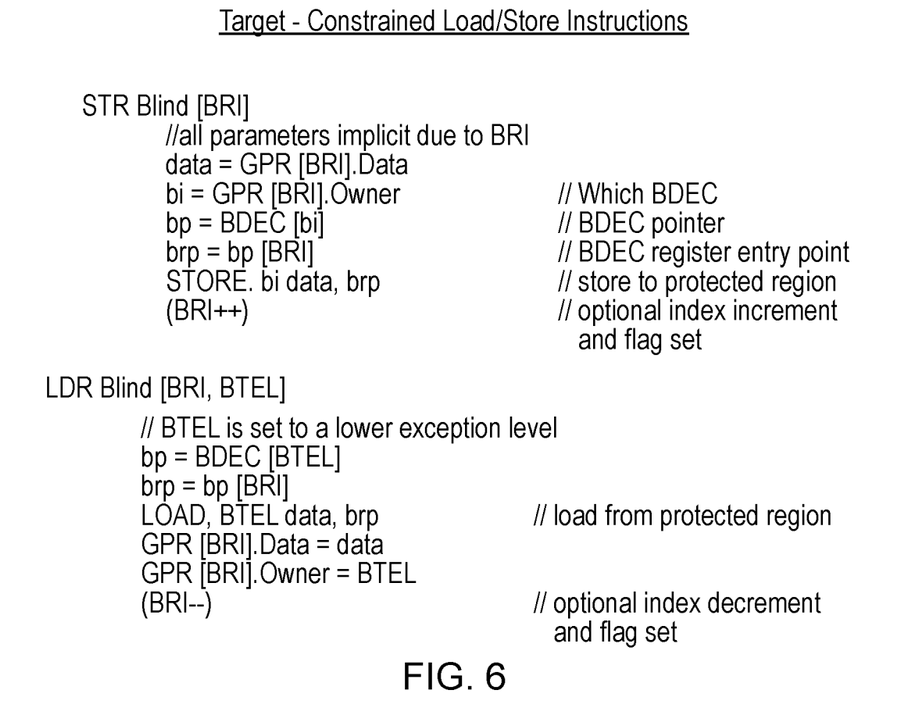
FIG. 6 schematically illustrates target-constrained load/store instructions.

The present disclosure provides target-constrained load and store instructions as illustrated in FIG. 6 which are decoded by the decoder circuitry 12 and control the load/store unit 18 to perform target-constrained data transfer operations with the memory 6 to a location specified by the storage pointer for the owning exception level of a register as discussed in relation to FIG. 4. These target-constrained load and store instructions have the form of a STRBlind instruction and a LDRBlind instruction. These instructions when decoded by the decoder circuitry 12 serve to control the load/store unit 18, and other portions of the processing core 4, to perform the processing operations specified in the pseudocode illustrated in FIG. 6.

In the case of the target-constrained store instruction STRBlind, this serves to store data from a general purpose register indicated by a current value of the register index variable BRI into a memory location indicated by a combination of the storage pointer of the associated owning exception level to the start of the 64-bit array 50 and the current register value BRI. The index value may be optionally incremented at the end of the execution of the target-constrained store instruction with a flag being set if the index value overflows or underflows its maximum or minimum values indicating that a sequence of register store operations has completed.

It will be appreciated that at a given point of time it is possible that the registers within the register bank 16 may be marked by their ownership values as having different respective owning exception levels. This circumstance may arise, for example, due the occurrence of nested interrupts in which the current content of the register bank was partially saved, and ownership claimed by the new exception level, when a further exception arises, which is itself to take ownership of the registers of the register bank and accordingly should save to the appropriated protected region 24, 26 the contents of the register bank 16 as indicated by their current ownership values. It will be seen from the pseudocode representation of the operation of the target-constrained store instruction that the parameter this instruction follows is the register index value BRI and the operations performed which identify the particular owner of a given register (the bi value), the storage pointer for the associated protected context data array (the bp value) and the individual storage location to be used for the data value to be saved from the register (the brp value) are all dynamically derived in dependence upon the current ownership value for the register to be saved.

The target-constrained load instruction LDRBlind illustrated in FIG. 6 takes both the register index BRI and a target exception level BTEL as input operands. The target exception level BTEL to which processing is to be returned, and accordingly the associated data values for the register bank 16 restored from the appropriate protected region 24, 26, is set by the exception handling code as this is responsible for controlling to which exception level processing is returned to after its exception handling. The pseudocode illustrating the functionality of the target-constrained load instruction also indicates that at the end of performing such a load for a given register index value BRI, the register index value may be optionally decremented, and a flag set if it overflows as previously discussed.

Upon exception entry the exception handling code serves to execute a sequence of target-constrained store instructions STRBlind following a sequence of register index values BRI so as to save to the appropriate protected region 24, 26 the current contents of the register bank 16. After saving the register contents with a STRBlind instruction the register may be set to a predetermined value, e.g. zero. When finishing the exception handling and before returning processing to a target exception level, the exception handling program is responsible for executing a sequence of target-constrained load instructions LDRBlind which serve to load back into the register bank 16 the data values stored within protected context data array of the respective protected region 24, 26 for the target execution level such that the protected execution environment returned to may recommence its processing.

The target-constrained load and store instructions STRBlind and LRDBlind are permitted to access data values associated with registers that are not owned by the exception level executing those target-constrained load and store instructions, but are subject to the constraint that the transfer to or from the memory 6 takes place to a location specified by the storage pointer associated with the exception level which does own the register value concerned (as well as a current index value as previously discussed). In contrast, the target-unconstrained load and store instructions of FIG. 5 are not able to access data values within registers which are not owned by the exception level which is executing those target-unconstrained load and store instructions.

Figure 7A:
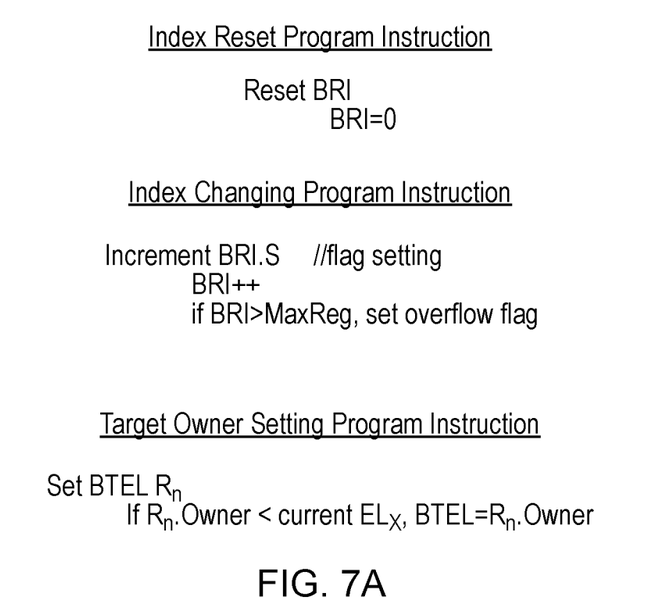
FIG. 7A schematically illustrates further instructions used in associated with the target-constrained load/store instructions.

FIG. 7A schematically illustrates the operation of three further program instructions decoded by the decoder circuitry 12 and associated with the use of the target-constrained load and store instructions, as well as an example of exception handling performing blind register saving and exception return performing a blind register restore.

An index reset program instruction ResetBRI is decoded by the decoder circuitry 12 and controls the processing circuitry 14 to reset the index value BRI to a value of zero (other embodiments may use a different reset value). An index changing program instruction IncrementBRI serves to change the current register index value BRI so as to follow a predetermined sequence of index values. In this example, the sequence is a monotonically increasing sequence starting from zero and up to a maximum number corresponding to the number of registers within the register bank 16 which require saving using the target-constrained load and store instructions. It will be appreciated that other sequences for the register index value may be used, such as a monotonically decreasing register index value. Further embodiments may utilize a sequence of index values that is non-canonical, but instead follows an order corresponding to a decreasing statistical frequency of use of the corresponding registers within the register bank 16 during normal operation of the data processing system 2. In this way, the first registers within the register bank 16 to be saved or restored by following the sequence are those with the highest likelihood of use. It may be that the exception handling routine will only serve to normally save off part of the register bank contents so as to free up registers for its own exception handling use, and will leave the other registers in place to be saved if additional register space is required. In this way, a sequence which first saves off or restores the most frequently used registers is useful in providing the exception handling program code with the registers it is most likely to need to use, without having to save off all of the contents of the register bank.

As previously mentioned, when an exception handling program is to return processing to the program that is to follow the exception handling, then it sets the target exception level to be associated with the restoring of the register bank contents using the target-constrained load instruction of FIG. 6. The decoder circuitry 12 is responsive to a target owner setting program instruction SetBTEL to set a target exception level to be restored. The target exception level is constrained to be lower than the current exception level which is executing the target owner setting program instruction (SetBTEL).

Figure 7B:
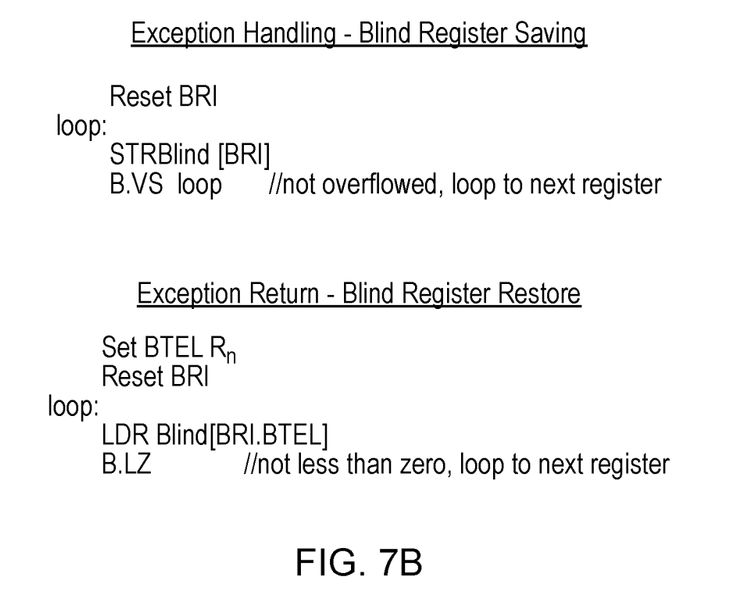
FIG. 7B schematically illustrates examples of register saving and register restore code sequences.

FIG. 7B illustrates an exception handling blind register saving routine. This segment of code is intended to be executed at the beginning, or close to the beginning, of an exception handling program routine. The code illustrated may in some embodiments be stored at the target vector location for the exception to be handled when entered from a protected execution environment. The blind register saving routine starts by resetting the register index value and then executes the target-constrained store instruction with an incrementing register index value until the sequence is complete as indicated by an overflow. In the example illustrated, the changing of the index value is performed by the target-constrained store instruction itself, and not using the separate index changing program instruction.

In some example embodiments a store sequence completed marker value may be stored within the 64-bit array 50 forming the protected execution environment context data. The store sequence completed marker value can be used to indicate that a full set of data values from the register bank 16 which are to be stored have actually been stored within the 64-bit array. The exception handling blind register saving program illustrated in FIG. 7B may include at its end as a separate instruction, or implicit within the action of the overflow from the target-constrained store instruction, the action of storing a store sequence complete marker value within the 64-bit array 50. This store sequence complete marker value can be read upon exception return which performs the blind register restore to verify that a full set of data values is being restored to the target exception level, i.e. a full set was properly saved when that exception level was left and accordingly it is appropriate to restore the full set of data values at this point. If a full set is not available to be restored, then an exception may be raised indicating that normal behavior has not been followed. The target-constrained load operation may check for the presence of such a store sequence complete marker value before it is permitted to proceed. The exception return blind register restore program sequence illustrated in FIG. 7B starts by execution of the target owner setting program instruction to identify the target exception level for which data values are to be restored to the register bank 16. The register index value is then reset by the index reset program instruction. Following this a loop is executed for the sequence of register index values to perform a constrained load operation from a memory address indicated by the storage pointer for the target exception level and the current value of the register index value until the register index value reaches the end of its sequence as indicated by an overflow.

It will be appreciated that in some known systems a processor may automatically save registers upon exception entry. The mechanisms described herein provide a more efficient approach, e.g. it may not be necessary to save and restore all registers upon exception entry as exception processing may only require a proper subset of the registers to be made available for its use.

Figure 8:
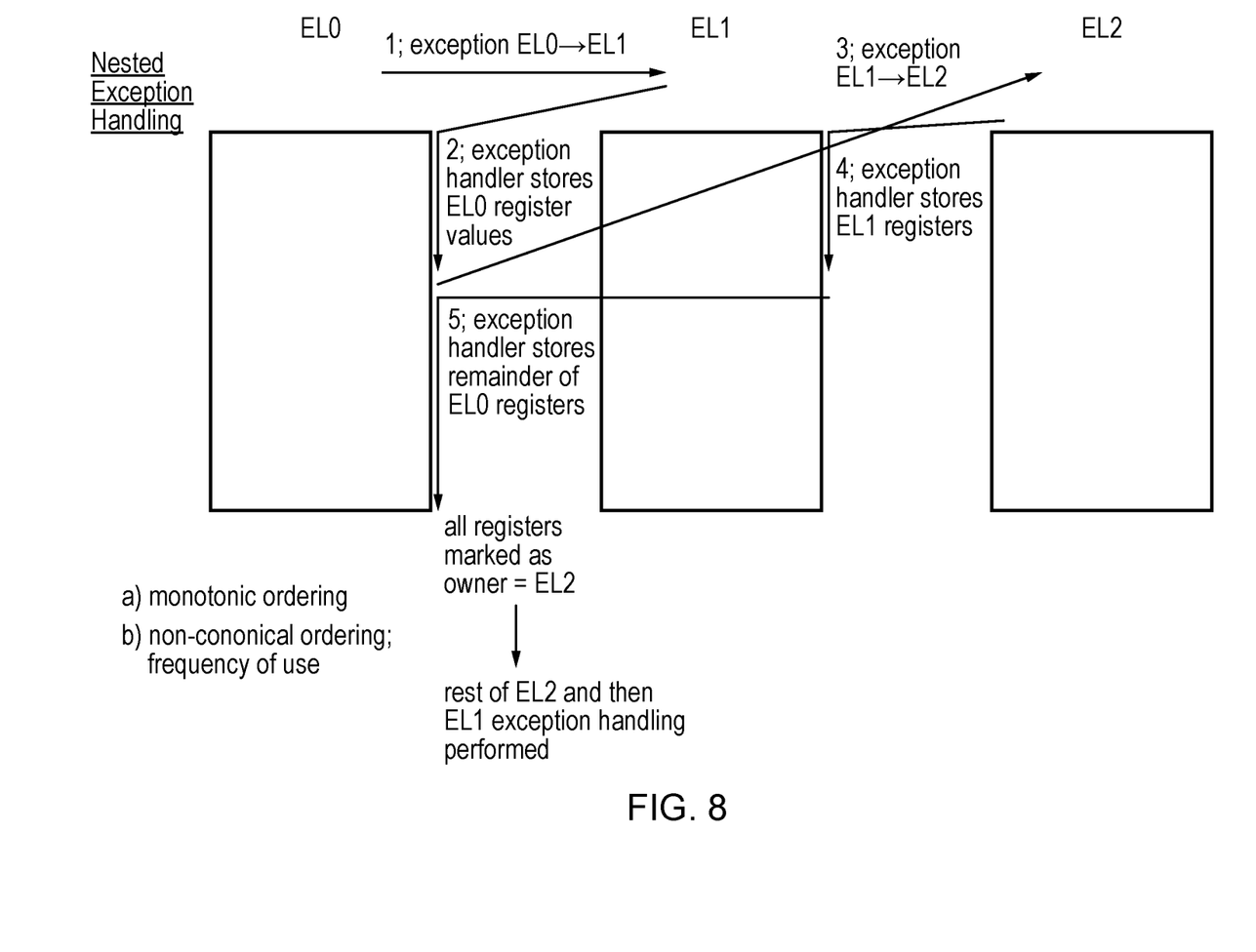
FIG. 8 schematically illustrates nested exception handling.

FIG. 8 schematically illustrates operation to perform register saving when nested exceptions arise. The data processing system 2 is initially operating at exception level EL0. At step 1 an exception arises taking the data processing system to exception level EL1. The exception handling program executing at exception level EL1 then starts saving the data values from the register bank 16 owned by the exception level EL0 into the protected region 24, 26 associated with exception level EL0. This is indicated by step 2 in FIG. 8. Partway through the saving of the data values owned by exception level EL0 at step 2, a further exception arises, indicated by step 3, which changes the data processing system 2 from executing at exception level EL1 to executing at exception level EL2. The exception handling program code at exception level EL2 then starts to save off the data values from the register bank 16 and again starts at the beginning of the sequence of register index values. This is indicated by step 4. The first portion of the data values to be saved correspond to registers which had already been saved off and claimed by the exception handling program executing at exception level EL1. The second portion of the data values to be saved indicated by step 5 are the remainder of the data values which are associated with exception level EL0 and were not saved by the exception handling program of exception level EL1. At the end of the saving values of the data values from the registers. all of the registers are marked with an ownership value indicating that they are owned by exception level EL2.

As each data value is saved off by the constrained store instruction as part of the exception handling, a new owner for that register is set using the ownership value to correspond to the exception level at which the execution of the constrained store instruction is performed. Thus, when all of the data values have been saved off from the register bank 16 to the appropriate protected region 24, 26, all of the registers will be marked as owned by exception level EL2.

It will be seen that the ownership values associated with the registers within the register bank 16 are set by constrained store instructions which save off the previous data values and claim ownership of the registers for their current exception level. Ownership values are returned to their original values by the constrained load instructions, which set the ownership value to the associated target exception level for those constrained load instructions.

Once the saving of the data values from the register bank 16 has been completed by the exception handler for exception level EL2, then the rest of the exception handling for exception level EL2 may be performed. When this is complete, the exception handling program may return processing to the exception handler of exception level EL1, as well as restoring the data values to the registers that were associated with exception level EL1 when it was exited.

Figure 9:
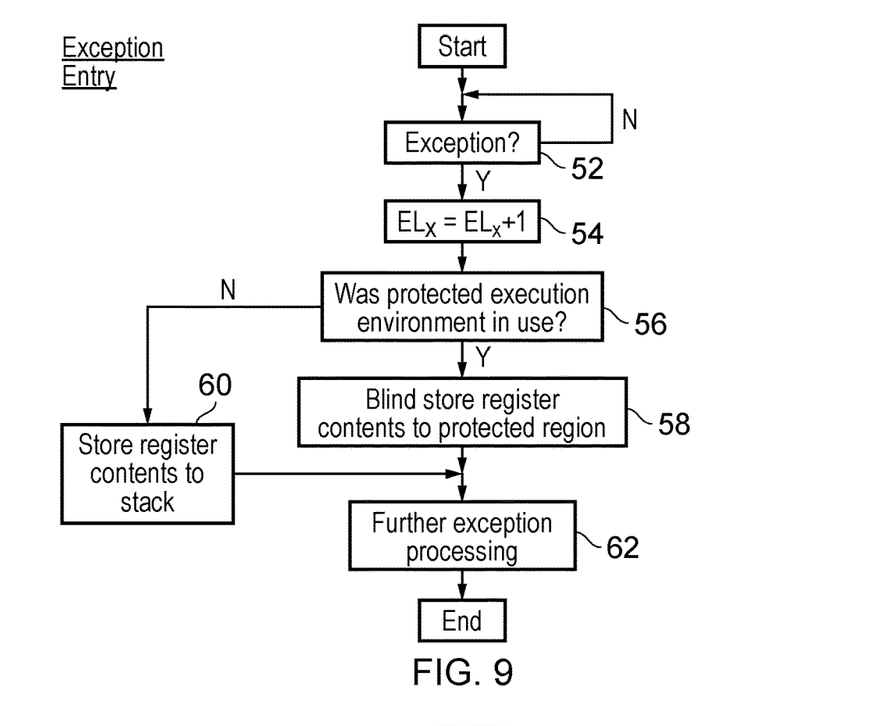
FIG. 9 is a flow diagram schematically illustrating exception entry.

FIG. 9 is a flow diagram schematically illustrating processing upon exception entry. At step 52 processing waits until an exception is detected. At step 54 the exception level in which the data processing system 2 is operating is incremented by the exception level control circuitry 20. At step 56 a determination is made as to whether or not the previously used processing was part of a protected execution environment. If the execution which was interrupted was part of a protected execution environment, then processing proceeds to step 58, as directed by the exception vector associated with interruption of a protected execution environment, so that the blind register saving sequence illustrated in FIG. 7 may be executed. If the interrupted processing was not from a protected execution environment, then processing proceeds to step 60 at which the data values from the registers may be stored by the exception handling code to stack memory in a conventional manner. Following either step 58 or step 60, processing proceeds to step 62 at which the further processing of the exception is performed.

Figure 10:
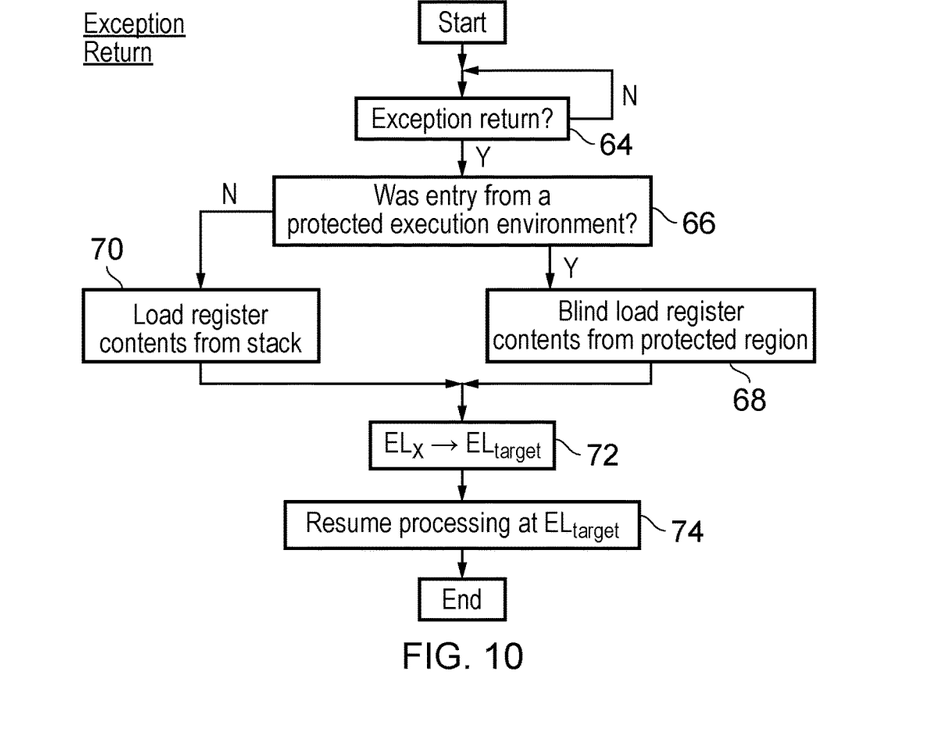
FIG. 10 is a flow diagram schematically illustrating exception return.

FIG. 10 is a flow diagram schematically illustrating exception return. At step 64 processing waits until exception return is desired. Step 66 then determines whether entry to that exception was from processing being performed in a protected execution environment. If entry was from a pro-tected execution environment, then processing proceeds to step 68 at which the blind register restore operation of FIG. 7 is performed. If entry was not from a protected execution environment, then processing proceeds to step 70 at which the register contents are restored from the stack memory in the conventional manner. Following either step 68 or step 70, processing proceeds to step 72 at which the exception level of the data processing system 2 is switched to the target exception level to which a return is being made. Step 74 then resumes processing at the target exception level.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
a plurality of registers to hold respective data values, each of said plurality of registers having an associated ownership variable;
processing circuitry to perform data processing operations specified by program instructions upon data values held within said plurality of registers;
register access control circuitry responsive to an ownership value specified by said associated ownership variable for a register of said plurality of registers to control access to said register by said processing circuitry in dependence upon said ownership value; and
exception level control circuitry to control said processing circuitry to operate in a current exception level among a plurality of exception levels, wherein
said ownership value specifies one of said plurality of exception level states, and
said register access control circuitry restricts access to said register by said processing circuitry to perform data processing operations specified by at least some program instructions when said current exception level is different in a predetermined manner from that specified by said ownership value, and
said plurality of exception levels correspond to a hierarchy of privilege levels extending from a lowest privilege level to a highest privilege level, an exception condition arising in operation of said processing circuitry, when operating at an exception level corresponding to a privilege level lower than said highest privilege level, triggering a switch to an exception level with a higher level of privilege, and
said predetermined manner is that said current exception level is higher in said hierarchy than an exception level specified by said ownership value,
wherein the lowest privilege level is less privileged than the highest privilege level.

2. Apparatus as claimed in claim 1, wherein said ownership value has a storage pointer and said register access control circuitry permits said processing circuitry to perform target-constrained data transfer operations in response to target-constrained data transfer program instructions between said register and a target memory address within a memory specified by said storage pointer.

3. Apparatus as claimed in claim 2, wherein said register access control circuitry prevents said processing circuitry from performing target-unconstrained data transfer operations in response to target-unconstrained data transfer program instructions between said register and a target memory address within said memory specified other than by said storage pointer.

4. Apparatus as claimed in claim 2, wherein
said ownership value and said storage pointer are associated with a protected execution context of said processing circuitry,
said protected execution context has a protected storage region within said memory, and
said protected storage region is inaccessible other than by said processing circuitry when operating in said protected execution context and by said target-constrained data transfer operations performed in response to said target-constrained data transfer program instructions.

5. Apparatus as claimed in claim 4, wherein said target memory address specified by said storage pointer is within said protected storage region.

6. Apparatus as claimed in claim 2, wherein said storage pointer has an associated register index value used in combination with said storage pointer to specify said target memory address for said target-constrained data transfer operations.

7. Apparatus as claimed in claim 6, wherein said register index value is part of a sequence of index values including an index value for use in specifying said target memory address to be used for each of said plurality of registers.

8. Apparatus as claimed in claim 7, wherein said processing circuitry is responsive to an index reset program instruction to set said index value to a starting value within said sequence.

9. Apparatus as claimed in claim 7, wherein said processing circuitry is responsive to an index changing program instruction to set said index value to a next index value within said sequence.

10. Apparatus as claimed in claim 7, wherein each of said plurality of registers has a respective register number and traversing said sequence of index values in a monotonic order corresponds to one of:
traversing said register numbers in a monotonic ordering; and
traversing said register numbers in an order corresponding to decreasing statistical frequency of use of corresponding registers within said plurality of registers during operation of said apparatus.

11. Apparatus as claimed in claim 7, wherein, when said target-constrained store operation performs a store for a last register index value within said sequence, a store sequence completed marker value is stored.

12. Apparatus as claimed in claim 2, wherein when said target-constrained data transfer operation is a target-constrained store operation to store a data value within said register to said target memory address, said processing circuitry uses said ownership value of said register to identify said storage pointer to be used to specify said target memory address.

13. Apparatus as claimed in claim 12, wherein said target-constrained store operation stores a predetermined value to said register and sets said ownership value of said register to match a current state of said processing circuitry.

14. Apparatus as claimed in claim 11, wherein said target-constrained load operation checks for presence of said store sequence completed marker value before loading said data value to said register.

15. Apparatus as claimed in claim 2, wherein when said target-constrained data transfer operation is a target-constrained load operation to load a data value to said register from said target memory address, said processing circuitry uses a target owner variable to identify said storage pointer to be used to specify said target memory address.

16. Apparatus as claimed in claim 2, wherein said target-constrained data transfer operation also sets said register index value to a next register index value within said sequence.

17. Apparatus as claimed in claim 1, wherein said processing circuitry is responsive to a target owner setting program instruction to set said target owner variable to correspond to a specified exception level of lower privilege level than said current exception level.

18. Apparatus as claimed in claim 1, wherein each of said exception levels having a privilege level lower than said highest privilege level provides support for a protected execution context that corresponds to an owner of registers within said plurality of registers.

19. Apparatus as claimed in claim 1, wherein, when said register access control circuitry detects an attempt by said processing circuitry to perform an access to said register with a state of said processing circuitry mismatched with said ownership value, said register access control circuitry triggers a register ownership exception.

20. Apparatus as claimed in claim 1, wherein said plurality of registers comprise one or more of:
scalar general purpose registers;
floating point registers; and
configuration registers.

21. A method of processing data comprising:
holding respective data values within a plurality of registers, each of said plurality of registers having an associated ownership variable;
performing data processing operations specified by program instructions upon data values held within said plurality of registers;
in response to an ownership value specified by said associated ownership variable for a register of said plurality of registers, controlling access to said register by said processing circuitry in dependence upon said ownership value,
controlling said processing circuitry to operate in a current exception level among a plurality of exception levels, wherein said ownership value specifies one of said plurality of exception level states, and
said method further comprises restricting access to said register by said processing circuitry to perform data processing operations specified by at least some program instructions when said current exception level is different in a predetermined manner from that specified by said ownership value, and
wherein said plurality of exception levels correspond to a hierarchy of privilege levels extending from a lowest privilege level to a highest privilege level, an exception condition arising in operation of said processing circuitry, when operating at an exception level corresponding to a privilege level lower than said highest privilege level, triggering a switch to an exception level with a higher level of privilege, and
said predetermined manner is that said current exception level is higher in said hierarchy than an exception level specified by said ownership value,
wherein the lowest privilege level is less privileged than the highest privilege level.

22. A method as claimed in claim 21, wherein
said ownership value has an associated storage pointer,
said controlling permits performance of target-constrained data transfer operations in response to target-constrained data transfer program instructions between said register and a target memory address within a memory specified by said storage pointer;

said ownership value and said storage pointer are associated with a protected execution context, said protected execution context has a protected storage region within a memory, and said protected storage region is inaccessible other than by said processing circuitry when operating in said protected execution context and by said target-constrained data transfer operations performed in response to said target-constrained data transfer program instructions.

23. A method as claimed in claim 21, comprising:

upon taking an exception and switching to a higher privilege level within a hierarchy of privilege level, executing one or more target-constrained program instructions to store values stored within said plurality of registers to said protected storage region; and upon returning from said exception and switching to a lower privilege level within a hierarchy of privilege level corresponding to said protected execution context, executing one or more target-constrained program instructions to load values stored within protected storage region to said plurality of registers.

* * * * *